Nov. 30, 1948.  M. JOVANOVICH ET AL  2,455,179
CONCENTRIC STEERING COLUMN GEARSHIFT

Filed Oct. 19, 1945  2 Sheets-Sheet 1

M. Jovanovich
J. J. Wharam
INVENTORS

BY Elwin C. McRae
R. C. Harris
Attorneys.

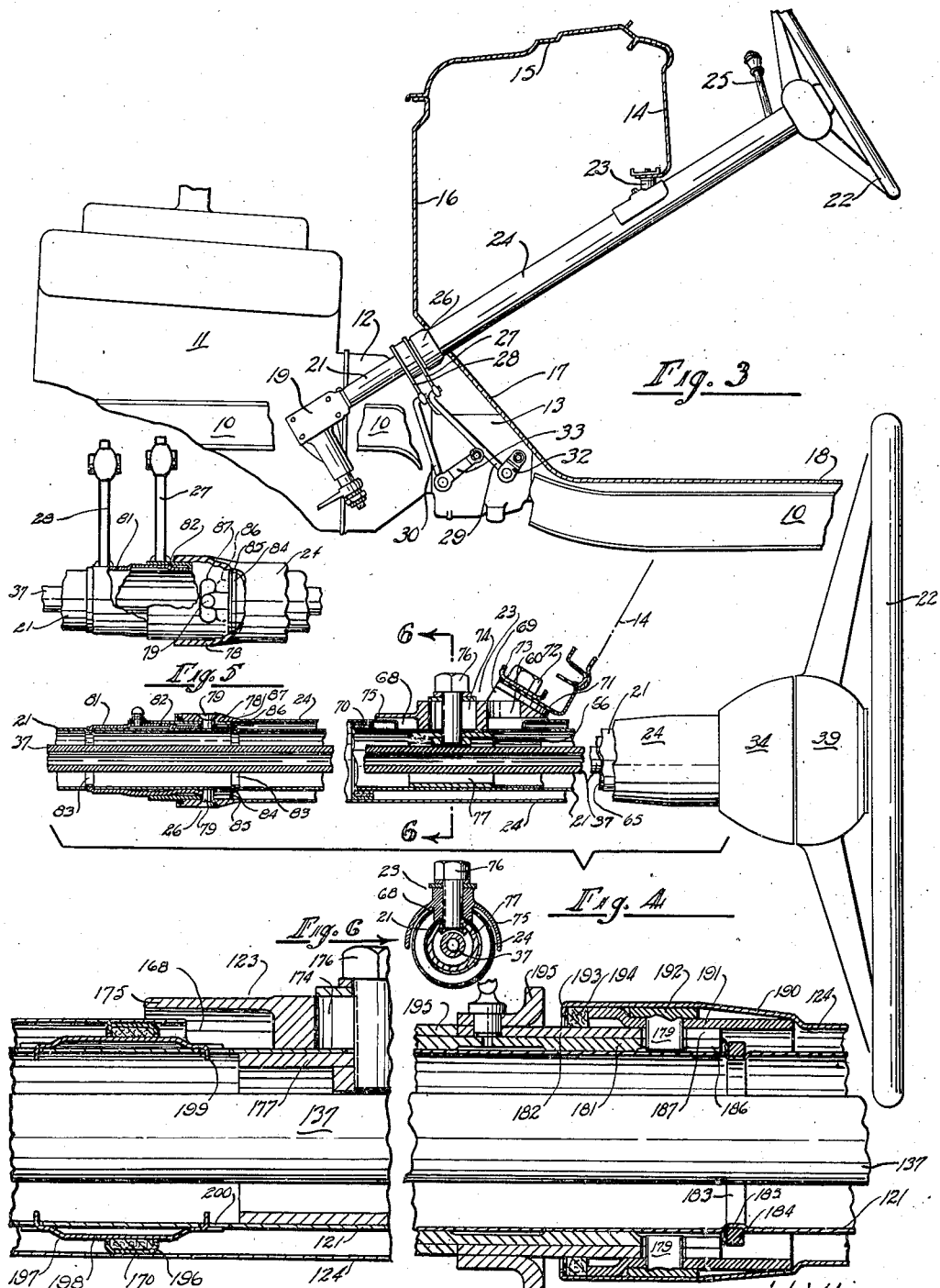

Patented Nov. 30, 1948

2,455,179

UNITED STATES PATENT OFFICE 2,455,179

CONCENTRIC STEERING COLUMN GEARSHIFT

Milton Jovanovich, Detroit, and John J. Wharam, Dearborn, Mich., assignors to Ford Motor Company, Dearborn, Mich., a corporation of Delaware Application October 19, 1945, Serial No. 623,246

8 Claims. (Cl. 74—484)

This invention relates to gearshifting or selecting devices as used on automotive vehicles; and, more particularly, to a gearshifting device located on the steering column of the vehicle having an operating lever adjacent the steering wheel and utilizing a concentric tube mounted exteriorly of the steering column and adapted to be reciprocated and oscillated to effect the desired selection.

The use of the steering column type of gearshift control is now all but universal in motor vehicle practice, but by far the greater number of these devices utilize a separate rod mounted alongside the steering column and controlled by an operating lever for reciprocation and rotation or, in combination with a cable, for rotation of the rod and reciprocation of the cable to effect the desired gear selection. While these devices have reached a high state of perfection in so far as mechanical efficiency is concerned, they all suffer from the prime defect that they adversely affect the appearance of the interior of the vehicle. The secondary tube is unsightly and, usually being in close proximity with the steering column itself, affords a lodging place in which dirt accumulates and which is difficult to clean. Moreover, special provision must be made for passing the secondary tube through the instrument panel of the vehicle and this, too, detracts from the decorative effect of that portion of the vehicle. Further, space immediately behind the instrument panel is at a premium due to the necessity for mounting the various instruments, controls, wiring and the like, and it is often difficult to make a satisfactory arrangement for these components and provide room for the secondary tube as well. Another defect lies in the fact that in traversing in the toeboard of the vehicle, two holes rather than one must be insulated against the entry of engine fumes, cold and dirt, leading to further complication. Finally, some provision must be made for an operative connection between the lower end of the secondary shaft and the transmission, per se; and as this usually takes the form of a selective clutching device, considerable space is required for the installation and operation of the necessary mechanism. Apart from this, it is difficult to secure and protect adequately the clutching mechanism, and it is subject to damage and displacement.

The advantage of the concentric type of gearshift is that each of these difficulties or defects is overcome. Since there is but one tube, it lends itself to decorative treatment and the assembly is easy to clean. It requires little more space than the simple steering column itself, and but one hole is required where it traverses the toeboard. Since the elements are concentrically arranged, the clutching device can be made integral with the steering column, per se, requiring much less room and affording greater protection for the parts.

Of course, the use of the concentric tube type of shift control has often been suggested; but the purpose of this present invention is to provide such a concentric arrangement which is notably superior in ease and effectiveness of operation both at the upper or operating end and the lower or clutching end and which is particularly clean and decorative in appearance throughout. The advantage of the present invention is that the concentric shifting tube forms the outer element of the steering column assembly and while both rotatively and reciprocally mounted, there are no gaps at any point which cause it to appear other than as a continuous structural element. Another advantage of the present construction is that it is certain and easy in operating and will not become noisy or loose, even after considerable wear. A further advantage of the invention is that the device, as a whole, is extremely economical to manufacture and utilizes, for the greater part, standard structural sections and may be manufactured according to a simple and uncomplicated procedure. Still another advantage of the invention is that an improved support is included which not only permits free oscillation and rotation of the shifting tube but also affords a firm support for it and the usual steering column and steering shaft, as well, while enclosing the essential mechanism.

Still another advantage is that all the internal elements are fully enclosed and there is no opportunity for leakage of the lubricant. Indeed, for the most part, the design is such that no lubricant is required. Yet another advantage lies in the ease of assembly of the device and the fact that the necessity for precise adjustment is kept to a minimum. A further advantage lies in the structural relationship of the steering column shaft, steering column and concentric tube whereby each of them reinforces the other and together they reinforce the instrument panel of the vehicle giving a much stronger construction than has heretofore been possible. Another advantage lies in the lower end or selective clutch construction which is simple to manufacture and requires much less space than that usually found necessary in other tubes of shifts.

With these and other objects in view, the invention consists in the arrangement, construction and combination of various parts of the improved device, described in the specification, claimed in the claims and illustrated in the accompanying drawings, in which:

Figure 3 is a partial sectional elevation through the forward portion of a motor vehicle showing the general arrangement of the gearshifting device with the other components of the vehicle.

Figure 4 is a longitudinal-vertical section through portions of the steering column.

Figure 5 is a plan view of the lower end of the steering column showing the clutching device, parts of the structure being broken away to show the internal construction.

Figure 6 is a transverse section taken substantially on the line 6—6 of Figure 4.

Figure 7 is a longitudinal-vertical section, substantially full size, taken adjacent the point of attachment of the steering column to the instrument panel, particularly to show the bearing means provided between the concentric shifting tube and the steering column in a modified form of the invention.

Figure 8 is a longitudinal-vertical section of the lower end of the column assembly showing a modified form of the clutching device.

Figure 1:
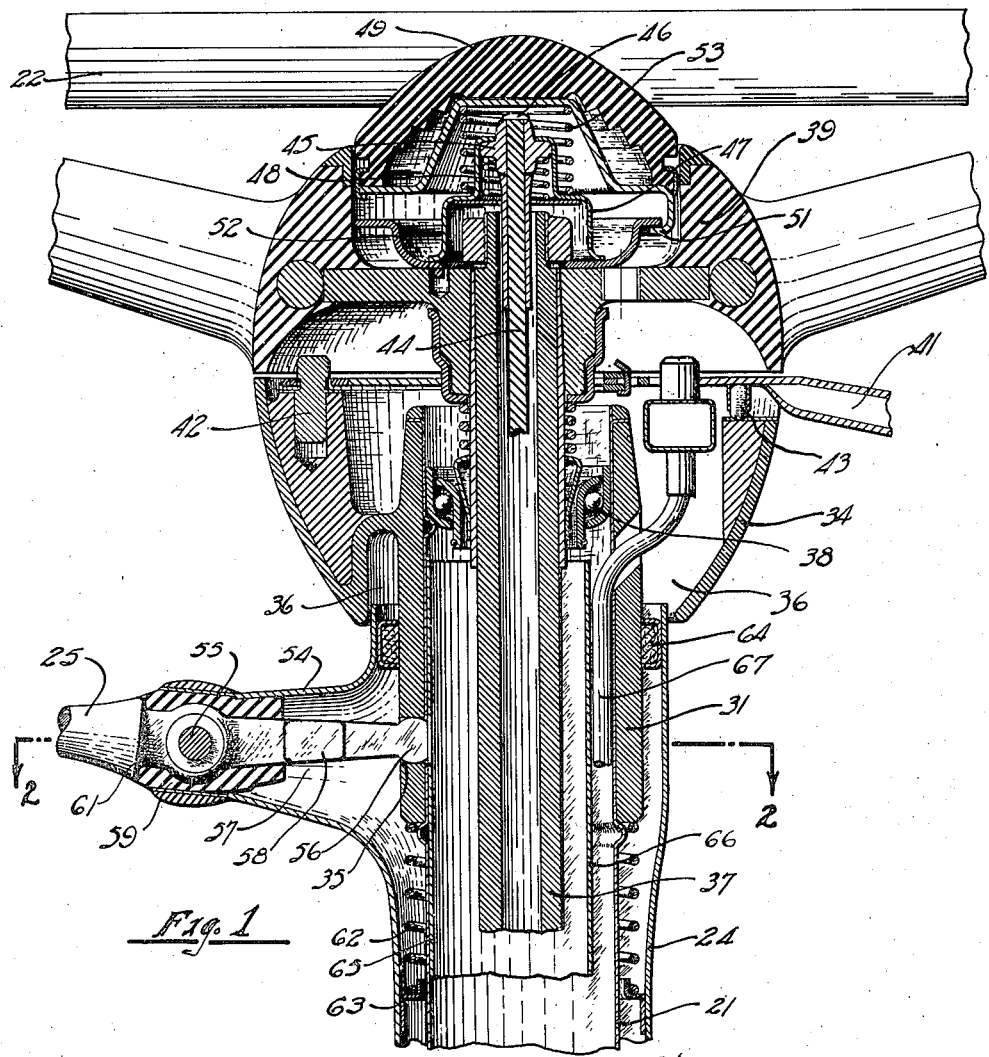
Figure 1 is a transverse sectional view through the upper end of the steering assembly embodying the concentric shifting tube.

Referring first to Figure 3, the general relationship of the components involved is shown. Reference character 10 indicates the side member of an automobile vehicle frame, portions of which are broken away to show the structure inwardly thereof. The frame 10 supports the motor 11 to which is attached the clutch housing 12 and the transmission 13 as well as the body, the pertinent parts of which are shown as the instrument panel 14, cowl 15, dashboard 16, toeboard 17 and floor 18. The steering gear 19 is also rigidly secured to the frame 10 and immovably supports the steering column 21 on which the steering wheel 22 is rotatably mounted. The steering column 21 is attached to the instrument panel 14 by the bracket 23, and mounted on the steering column 21 for limited reciprocation and rotation is the concentric shifting tube 24 whose movements are controlled by the gearshifting lever 25. The concentric tube 24 terminates at its lower end in a clutching mechanism indicated generally at 26, which includes two operating levers 27 and 28 which are connected by the links 29 and 30 to the shifting levers 32 and 33 on the transmission 13.

Figure 2:
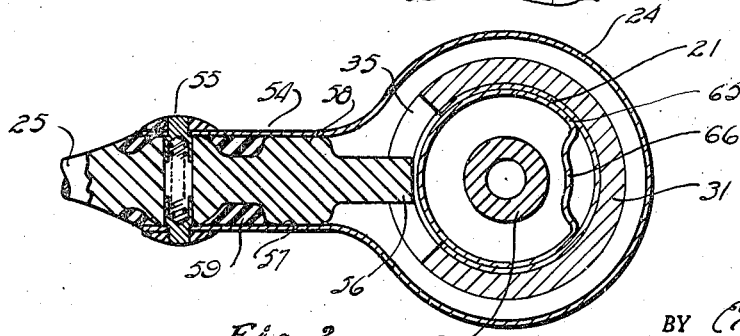
Figure 2 is a transverse section taken substantially on the line 2—2 of Figure 1.

Referring now to Figures 1 and 2, one form of upper structure end of the device of this invention is shown. It will here be noted that the upper end of the steering column 21 is fixed on a sleeve 31 of the head 34 which is preferably formed as a die casting and has a partial annular slot 35 in the sleeve 31 and a concentric channel 36 between the sleeve 31 and the main body of the head 34. The steering shaft 37, which leads to the steering gear 19, is rotatably supported in the bearing 38 adjacent to the upper end of the column 21 and is fixed to the hub 39 of the steering wheel 22. In the present construction, the head 34 and hub 39 together enclose a directional signal operating switch having a control lever 41 pivotally mounted on pin 42 and selectively engaging the contact 43. The switch is of the general type shown in United States Patent 2,269,499, in which a full description of it will be found. The steering shaft 37 is hollow and through it extends the horn control cable 44 terminating in the head 45 having a contact 46 and reciprocably supported in the housing 47 by the spring 48. The horn button 49 is reciprocably mounted within the hub 39 and is held in place by bayonet lugs 51 interlocking with the dished member 52 and normally urged outwardly by the spring 53.

The concentric tube 24, in this form of the device, has an integrally formed side extension 54 adjacent its upper end in which the gearshift lever 25 is pivotally mounted on the pin 55 with its inner end 56 seated in the annular slot 35. The sidewalls 57 of the extension 54 are parallel for at least a part of their extent and slidably support the bosses 58 formed on the gearshifting lever 25 intermediate the pivot 55 and the inner end 56 during pivotal movement of the lever about the pin. A resilient sleeve 59 fits over the gearshifting lever 25 adjacent the pin 55 abutting against the shoulder 61 and the walls 57 sealing the interior of the tube and cushioning the operation of the lever. A compression spring 62 is interposed between the lower edge of the sleeve 31 and an annular support 63 secured to the concentric tube 24 normally urging the tube downwardly. The fabric bushing 64 pressed into the upper end of the concentric tube 24 engages the outer surface of the sleeve 31, permitting free relative reciprocation or oscillation between these elements. An internal reinforcing tube 65 is pressed within the upper end of the steering column 21 and has an inset portion 66 to accommodate the cable 67 leading from the directional signal contact 43 to the main electrical harness of the vehicle. A modified form of this general upper end construction is shown in copending application Serial No. 623,248 filed October 19, 1945, now Patent No. 2,455,204, dated November 30, 1948.

Reference is now made to Figures 4 and 6 showing the manner of supporting this construction. It will be noted that an opening 68 is formed in the upper side of the concentric tube 24 extending about 30 degrees on either side of the vertical and at least long enough to admit of the necessary reciprocation of the tube. The bracket 23 has a spaced pair of obliquely faced bosses 69 adapted to bear against the lower flange 71 of the instrument panel 14 and secured in place by cap screws 72 extending through it and a reinforcing channel 73. The bracket 23 has a central longitudinal slot 74 and a depending semicylindrical skirt 75 extending longitudinally of the column sufficiently to cover the opening 68 in either position of reciprocation of the tube 24 and around the tube sufficiently to seal the opening 68 in either position of oscillation of the tube. A cap screw 76 extends through the slot 74 and an opening in the steering column 21 and threadedly engages a reinforcing sleeve 77 within the steering column 21. The slot 74 permits the necessary longitudinal adjustment between the instrument panel and the fixed point provided by the steering gear 19; and when the cap screw 76 is drawn up, the steering column 21 is rigidly clamped to the bracket 23 and thus to the instrument panel 14. At the same time, the concentric tube 24 is free to oscillate and rotate on the steering column 21 but the skirt 75 effectively encloses the opening in it necessary for the support of the assembly. A fabric bushing 70 is interposed between the tube 24 and the column 21 adjacent the opening 68 for a purpose which will be described in full with relation to Figure 7. An opening 60 in the bracket 23 permits the directional signal cable 67 shown in Figure 2 to pass from the inset 66 in the tube 65 for connection to the appropriate lighting circuit behind the dash so that even this connection is fully concealed.

Figures 4 and 5 show one form clutching device which may be used at the lower end of the steering column. This comprises an end section 78 of increased thickness formed at the lower extremity of the concentric tube 24 in which are inserted the diametrically opposed clutching pins 79. A pair of concentric sleeves 81 and 82 are rotatably mounted on the exterior of the steering column 21 and held against relative longitudinal displacement between the two annular channels 83 formed in the steering column 21, the lower end of the inner sleeve 81 being spun into the lower channel and a snap ring 84 seated in the upper channel securing the upper ends of both sleeves 81 and 82 through a spring washer 85. The operating levers 27 and 28 are secured to the sleeves 82 and 81 and each sleeve has oppositely disposed T slots designated as 86 in the inner sleeve 81 and 87 in the outer sleeve 82 which may be selectively engaged by the clutching pins 79.

It is believed the operations will be quite clear from a consideration of Figures 4 and 5 showing that when the concentric sleeve 24 is in lower position of reciprocation the clutching pins 79 engage the inner sleeve 81 for rotation but do not engage the outer sleeve 82 since the pins 79 are then aligned with the head of the slot 87 in the outer sleeve. In the same manner, when the concentric tube 24 is in the uppermost position of reciprocation, the clutching pins 79 are then aligned with the head of the T slot 86 in the inner sleeve 81 and rotation of the tube 24 occasions rotation only of the other sleeve 82. The usual interlocking device which prevents simultaneous operation of both sleeves 81 and 82 is incorporated in the transmission of the vehicle as is quite customary in this type of gearshift, and the clutching device merely transmits the torque of the concentric tube to the selected sleeve and then to the associated operating lever. A more complete description of this structure is contained in the copending application expressly directed to it and filed this day.

Attention is now directed to Figure 8 showing a modified form of the lower end construction conforming in operation to the structure shown in Figure 5 and the lower portion of Figure 4. Here, the concentric tube is indicated at 124 enclosing, as above, the steering column 121 and the steering shaft 137. The lower end of the concentric tube 124 is flared outwardly at 190 to receive and secure the reinforcing sleeve 191 in which are welded the studs 192 whose shanks 179 serve as the clutching pins described above. The outer end of the flared portion 190 is then turned over as at 193, a felt seal 194 being interposed to keep lubricant within the housing so formed. As before, two concentric clutching sleeves 181 and 182 are rotatably mounted on the steering column 121 and held in position at one end by the snap ring 184 in the channel 183 and the spring washer 185. A flanged band 195 is secured to each sleeve, that for the outer sleeve 182 alone being shown in full, although the cylindrical portion of the band 195 for the outer sleeve 182 is shown in part. To these flanged bands 195 are then secured operating levers such as those shown in Figure 5 for transmitting the rotational torque of the selected concentric sleeve 181 or 182 to the respective operating lever on the transmission. As before, the sleeves are equipped with T slots 186 in the inner sleeves 181 and 187 in the outer sleeve 182 permitting selective clutching to either sleeve depending upon the reciprocated position of the tube 124.

A further modification of the supporting bracket is shown in Figure 7 corresponding to the structure shown in the midportion of Figure 4 and in Figure 6. Here the same reference characters are applied as in Figure 8, and the supporting bracket is shown at 123. As before, this bracket is connected by a cap screw 176 engaging the reinforcing sleeve 177 in the interior of the steering column 121. The cap screw is mounted in the elongated central slot 174 in the bracket to permit longitudinal adjustment. The bracket 123 has the skirt 175 covering the opening 168 in the concentric tube 124. The bearing 70, referred to in connection with the description of the midportion of Figure 4, is shown here as 170 and is of the fabric type having a metal casing 196 pressed within the steering column 121 and located a short distance below the opening 168 through which it is introduced. The complimentary bearing member comprises a sleeve 197 having a raised center portion 198 and a number of ears 199 at each end. This sleeve is slipped over the exterior of the steering column 121 and and brought to approximate position on it. The ears 199 are then bent inwardly to engage the holes 200 located in the steering column locating the sleeve 197 longitudinally to engage the bearing 170 throughout its range of reciprocation with the concentric tube 124. The use of a separate sleeve permits much easier assembly of the device, since the concentric tube may slide into almost final position without engaging the bearing surface. This construction makes full use of the structural resistance of the concentric tube 124 in reinforcing the steering column assembly as a whole. Although the steering shaft 137 is considerably heavier in cross-section because of its much smaller radius, it is not particularly resistant to bending stresses imposed at the wheel; and while it is reinforced to some extent by the steering column 121, there is no direct connection between these two components except at their upper and lower ends. As a result, when the driver places any particular weight on the steering wheel, the column tends to bend considerably and despite the fact that it is attached to the instrument panel, this latter element is itself not sufficiently resistant to prevent considerable misalignment. However, by providing the bearing just described, the resistance to bending of the concentric tube 124, which has the maximum diameter and hence the more efficient distribution of metal, is added to that of the assembled column and shaft and as a result, the outer tube, although slidably mounted and reciprocably mounted, materially assists in supporting the steering column 121 immediately adjacent the attachment of the latter element to the instrument panel, giving a much more resistant assembly throughout. A somewhat more detailed description of this will be found in the copending application thereon filed this day.

The advantage of the foregoing construction is believed to be quite clear from the detailed description of the parts as well as the recitation of their operation in performing the various gearshifting functions. As pointed out previously, the instant device may be made much neater looking than is possible with separate tube shifters, it is more compact, it may be sealed against leakage of lubricants, and it is a more economical construction both as to the clutching and the operating means than are any of the generally used shifting devices.

It is thought that certain changes may be made in the detailed construction here shown, and it is the intention to cover by the claims such changes as are reasonably included within the scope thereof.

The invention claimed is:

1. In a gearshifting mechanism associated with the steering column of a motor vehicle, comprising, a tube concentrically mounted exteriorly of said column for reciprocation and rotation with respect thereto, a pair of axially aligned arms rotatably mounted on said steering column adjacent the lower part thereof, clutch means operated by said tube for selective engagement and operation of said arms and means adjacent the upper end of said steering column to reciprocate and rotate said tube comprising a fulcrum bracket fixed with respect to and extending outwardly of said tube and an operating lever having an intermediate pivot on said fulcrum bracket and its inner end engaging said steering column.

2. In a gearshifting mechanism associated with the steering column of a motor vehicle, comprising, a tube concentrically mounted exteriorly of said column for reciprocation and rotation with respect thereto, a pair of axially aligned arms rotatably mounted on said steering column adjacent the lower part thereof, clutch means operated by said tube for selective engagement and operation of said arms, means adjacent the upper end of said steering column to reciprocate and rotate said tube comprising a fulcrum bracket fixed with respect to and extending outwardly of said tube and an operating lever having an intermediate pivot on said fulcrum bracket and its inner end engaging said steering column, said steering column terminating in a fixed head having a circumferential channel overlying and receiving the upper end of said tube throughout its positions of reciprocation.

3. In a gearshifting mechanism associated with the steering column of a motor vehicle, comprising, a tube concentrically mounted outside said column for reciprocation and rotation with respect thereto, a pair of axially aligned arms rotatably mounted on said steering column adjacent the lower part thereof, a clutch means operated by said tube for selective engagement and operation of said arms, means adjacent the upper end of said steering column to reciprocate and rotate said tube, said last-named means including an integral fulcrum bracket extending outwardly from said tube and an operating lever having an intermediate pivot on said fulcrum bracket and its inner end engaging said steering column, a fixed head at the upper end of said steering column, a circumferential channel in the lower surface of said head receiving the upper end of said tube in its successive positions of reciprocation, and spring means interposed between said head and said tube normally urging said tube to its lowermost position of reciprocation.

4. In a gearshifting mechanism associated with the steering column and instrument panel of a motor vehicle, comprising, a tube concentrically mounted outside said column for reciprocation and rotation with respect thereto, a pair of axially aligned arms rotatably mounted on said steering column adjacent the lower part thereof, clutch means operated by said tube for selective engagement and operation of said arms, a fulcrum bracket extending outwardly of said tube adjacent the upper portion thereof, an operating lever having an intermediate pivot on said fulcrum bracket and its inner end engaging said steering column, a rigid connection between said instrument panel and said steering column, said connection comprising a bracket secured at one end to said steering column and at its other end to said instrument panel and passing through a longitudinal slot in said tube between said ends.

5. In a gearshifting mechanism associated with the steering column and instrument panel of a motor vehicle, comprising, a tube concentrically mounted outside said column for reciprocation and rotation with respect thereto, a pair of axially aligned arms rotatably mounted on said steering column adjacent the lower part thereof, clutch means operated by said tube for selective engagement and operation of said arms, a fulcrum bracket extending outwardly of said tube adjacent the upper end thereof, an operating lever having an intermediate pivot on said fulcrum bracket and its inner end engaging said steering column, a bracket secured to the lower edge of said instrument panel and to said steering column supporting said panel and column in spaced relationship, said tube having a slot encompassing said bracket to permit reciprocation and rotation of said tube between said panel and column, said bracket comprising a skirt overlying the exterior of said tube adjacent said opening and adapted to cover said opening in the various positions of reciprocation and rotation of said tube.

6. In a gearshifting mechanism associated with the steering column of a motor vehicle, comprising, a tube concentrically mounted outside such column for reciprocation and rotation with respect thereto, a pair of axially aligned arms rotatably mounted on said steering column adjacent the lower part thereof, said arms adapted to be connected to a transmission for selective operation thereof, clutch means operated by said tube for selective engagement of said arms through reciprocation of said tube and operation of said arm so selected by rotation of said tube, a fulcrum bracket formed with said tube and extending outwardly thereof adjacent the upper end of said column, an operating lever having an intermediate pivot in said fulcrum bracket and its inner end engaging said steering column, a head rigidly secured to the top of said steering column, an annular slot in said head receiving the inner end of said operating lever, a circumferential slot in the lower surface of said head receiving the upper end of said tube throughout its positions of reciprocation, and a bracket for said steering column adapted to be attached rigidly to said instrument panel, said bracket traversing an elongated opening in said tube and having a skirt overlying the outer surface of said tube and covering said opening throughout the various positions of reciprocation and rotation of said tube.

7. In a gearshifting mechanism associated with the steering column and instrument panel of a motor vehicle, comprising, a tube concentrically mounted outside such column for reciprocation and rotation with respect thereto, a pair of axially aligned arms rotatably mounted on said steering column adjacent the lower part thereof, means connecting said arms to the transmission of said motor vehicle for selective operation thereof, clutch means rotatably mounted on said steering column operated by said tube for selective engagement and operation of said arms, said clutch means selecting one of said arms on reciprocation of said tube and operating said selected arm by rotation of said tube in said position of reciprocation, a head rigidly secured to the upper end of said steering column, a fulcrum bracket formed with said tube and extending outwardly therefrom, an operating lever having an intermediate pivot on said fulcrum bracket, an annular slot on said head aligned with said bracket, the inner end of said operating lever being received in said slot to serve as a fulcrum for the up-and-down movement of said lever, and to permit joint rotation of said lever and said tube with respect to the axis of said column, a circumferential slot in the lower surface of said head receiving the upper end of said tube throughout its positions of reciprocation, a connection between said instrument panel and said steering column comprising a bracket rigidly secured to said last two members and passing through an elongated opening in said tube, said bracket including a skirt overlying a portion of said tube and extending therealong to cover said opening therein throughout the positions of reciprocation and rotation of said tube.

8. The structure of claim 4 which is further characterized in that said pivot is mounted on said column for reciprocation parallel to the longitudinal axis of said column and rotation on spaced planes normal to said longitudinal axis.

MILTON JOVANOVICH.
JOHN J. WHARAM.

REFERENCES CITED

The following references are of record in the file of this patent:

UNITED STATES PATENTS

| Number | Name | Date |
| --- | --- | --- |
| 1,425,227 | Woodward | Aug. 8, 1922 |
| 1,515,236 | Woodward | Nov. 11, 1924 |
| 1,815,871 | Douglas | July 21, 1931 |
| 2,317,654 | Wharam | April 27, 1943 |